(No Model.) 4 Sheets—Sheet 3.
E. J. HOUSTON & A. E. KENNELLY.
APPARATUS FOR MEASURING CANDLE POWER OF ARC LAMPS.
No. 569,643. Patented Oct. 20, 1896.
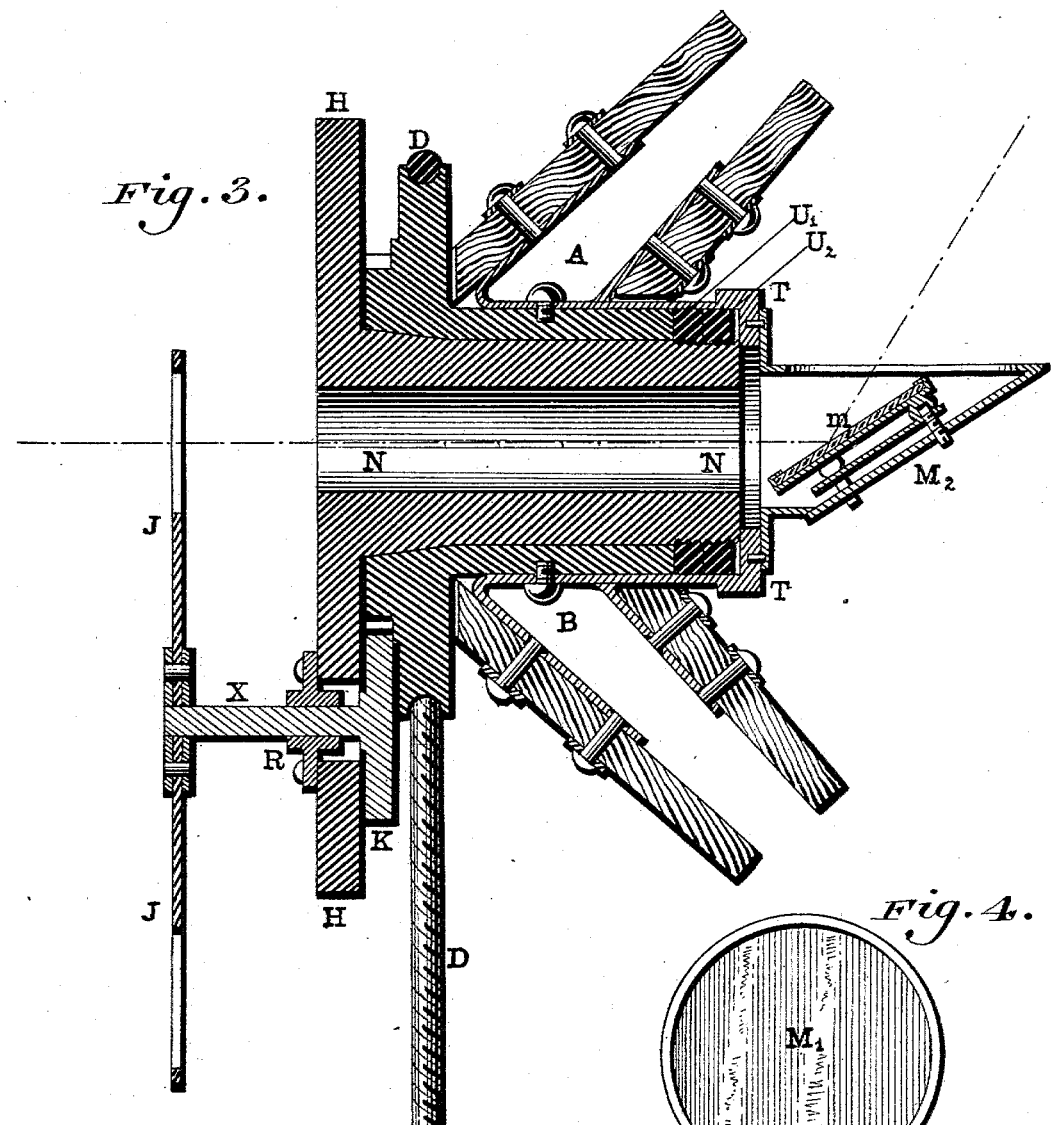
WITNESSES:
P. H. Eagle.
L. Douville.
INVENTORS
Edwin J. Houston
Arthur E. Kennelly (No Model.) 4 Sheets—Sheet 4.
E. J. HOUSTON & A. E. KENNELLY.
APPARATUS FOR MEASURING CANDLE POWER OF ARC LAMPS.
No. 569,643. Patented Oct. 20, 1896.
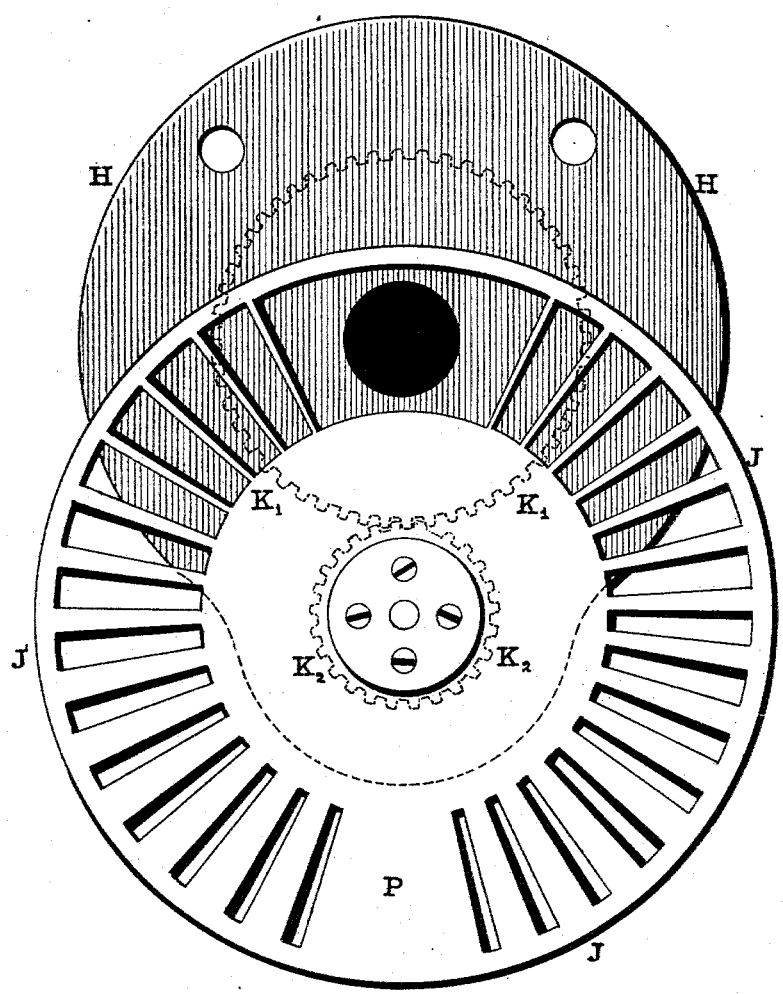
WITNESSES:
P. F. Aaglo.
L. Douville.
INVENTORS
Edwin J. Houston
Arthur E. Kennelly.

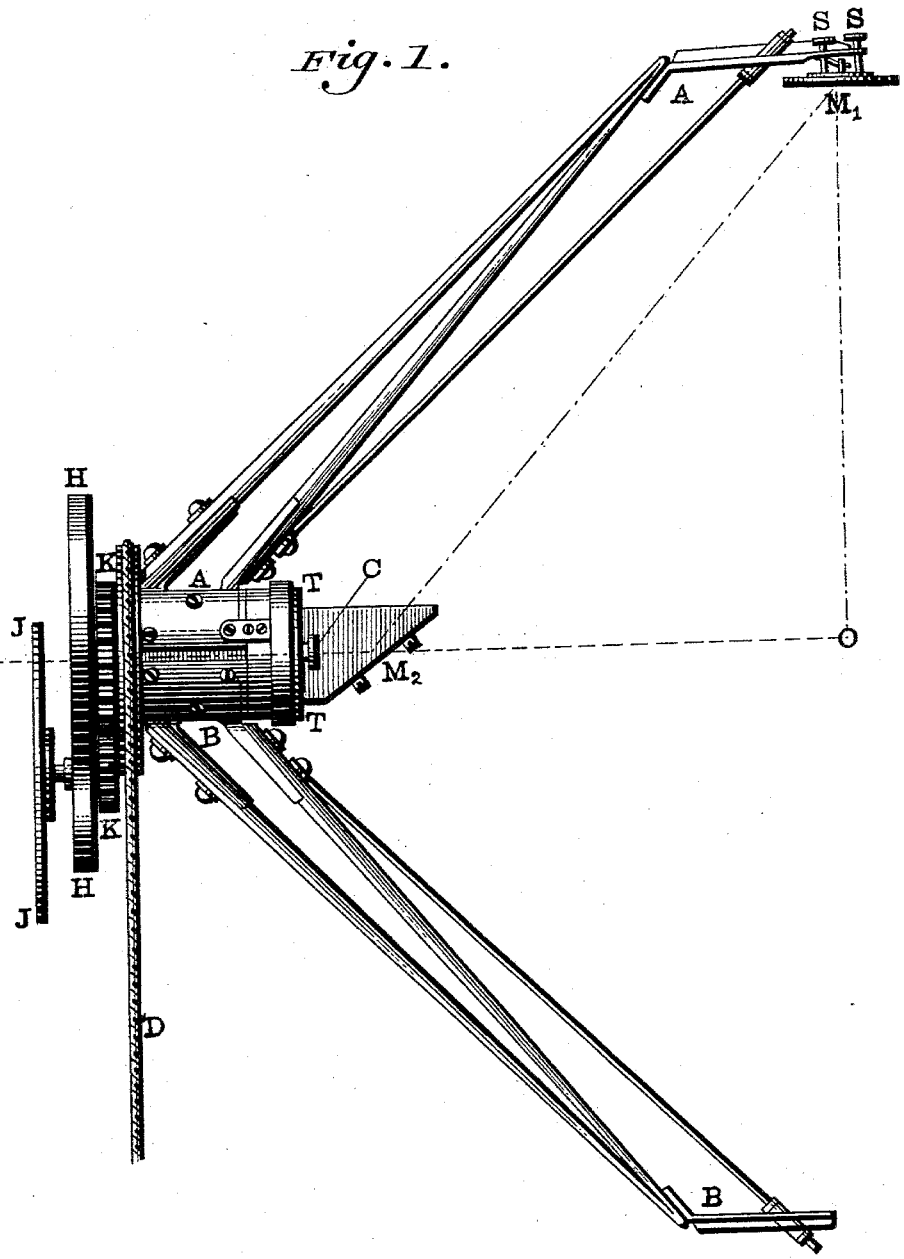

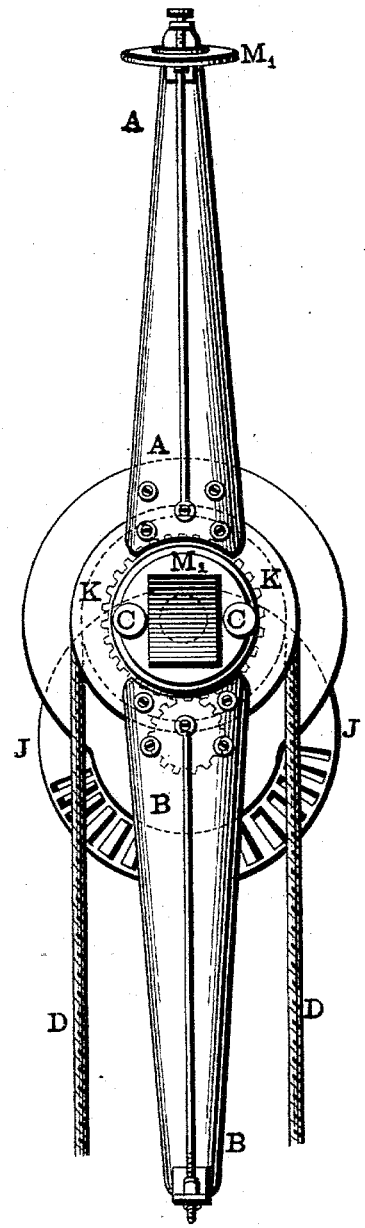

UNITED STATES PATENT OFFICE.

EDWIN J. HOUSTON AND ARTHUR E. KENNELLY, OF PHILADELPHIA, PENNSYLVANIA.

APPARATUS FOR MEASURING CANDLE-POWER OF ARC-LAMPS.

SPECIFICATION forming part of Letters Patent No. 569,643, dated October 20, 1896.

Application filed May 11, 1896. Serial No. 591,178. (No model.)

*To all whom it may concern:*

Be it known that we, EDWIN J. HOUSTON and ARTHUR E. KENNELLY, of the city and county of Philadelphia, in the State of Pennsylvania, have invented certain new and useful Improvements in Methods of and Apparatus for Directly Measuring the Mean Spherical Candle-Power of a Source of Light, whereof the following is such a description as will enable those skilled in the art appertaining thereto to make and use the same, reference being had to the accompanying drawings and letters of reference marked thereon.

It is well known that heretofore the methods for determining the mean spherical candle-power of a source of light have been quite tedious to carry out, requiring, as they do, a number of measurements of the intensity in different directions from the source. By means of our improved apparatus the mean spherical candle-power can be determined by a single observation.

The principle on which our apparatus is constructed is as follows: If a source of light sufficiently small to be considered practically as a point produces a distribution of luminous intensity which is uniform in azimuth, but varies in altitude, it is known that the mean spherical luminous intensity of the source is expressed by the equation $$\text{Mean spherical luminous intensity} = \tfrac{1}{2}\int_{-\frac{\pi}{2}}^{\frac{\pi}{2}} I_\beta \cos \beta \, d\beta,$$

where $I_\beta$ is the luminous intensity measured in candles or other units at the angle of elevation or altitude $\beta$ above the horizon passing through the source, depression-angles, or angles below the horizon, being counted as negative. This equation shows that in order to obtain the mean sperical candle-power it is only necessary to multiply the luminous intensity at any altitude by the cosine of that altitude and the infinitesimal element of arc $d\beta$ covered by that intensity, to integrate or take the sum of all such elements between the zenith and nadir, and to divide the total by two. Our process then consists simply in a mechanical device whereby this integration of luminous intensity is automatically effected. This is accomplished by mounting a plane mirror on a revolving arm, so as to rotate in or near a vertical plane passing through the source, which is so placed that its poles of luminous distribution are at the zenith and nadir of the plane of revolution, and to throw the rays incident upon its face on a second plane mirror at the axis of the revolving arm. The second mirror throws the beam on the photometer-screen through a tube in the axis of the revolving arm. In addition a device is required whereby the intensity of the incident beam is reduced in proportion to the simple harmonic law between the zenith or nadir and the horizon. In other words, when the revolving arm is horizontal the full intensity is allowed to fall upon the photometer-screen. At the vertical position above or below, the incident beam is entirely cut off, and at intermediate angles the intensity is allowed to vary as the cosine of the altitude.

Figure 1 represents a side elevation of the apparatus ready for being mounted on a suitable support opposite a photometer-screen. Fig. 2 is a front elevation of the apparatus. Fig. 3 is a longitudinal section of the tube forming the axis of the revolving arms. Fig. 4 is a plan of the mirror on the extremity of the revolving arm. Fig. 5 shows the device whereby the intensity of the incident beam passing through the tube is varied sensibly in proportion to a simple harmonic law.

In Fig. 1, M' is a plane mirror mounted on the ends of the revolving arm A A, which may be of wood or other suitable material and shaped so as to offer as little resistance as possible to rapid movement through the air. This mirror is capable of being adjusted in position about an axis at right angles to the revolving arm by the two set-screws S S. B B is a counterpoise-arm provided to insure freedom from vibration when the apparatus is operated. $M^2$ is a receptacle facing M' and containing a second plane mirror. These mirrors may be replaced by specula when it is important to reduce the absorption of light as far as possible. The receptacle $M^2$ is clamped by two set-screws C to the face of the metal tube T, which serves as the axis for the revolving arms. D is a cord or belt passing over a pulley and leading to an electric motor, or any suitable mechanical device, for driving the revolving arms with the required angular velocity. This velocity may conveniently be one thousand revolutions per minute, and should not be less than six hundred revolutions per minute. K K are two gear-wheels provided to communicate the rotary motion of the revolving arms to the disk J J. H H is the solid metallic base by which the apparatus is fixed in a vertical position to a suitable upright support at right angles to the photometer-bar. The source of light whose means pherical luminous intensity is to be measured is situated at the point O in the line of the axis of the tube T T, and therefore in line with the photometer-bar, and also in the plane of revolution of the mirror M'. If it is mechanically impossible to bring the mirror M' into the vertical plane, through the source, it is brought as near to that plane as possible, and correction may be made for the excursion. The poles of spherical distribution of luminous intensity in the source are situated on the line O M', so that the luminous distribution is symmetrical in any plane perpendicular to O M'. If the slotted disk J were removed, the apparatus would, when in operation, integrate upon the photometer-screen an illumination proportional to $\frac{1}{2}\int_{-\frac{\pi}{2}}^{\frac{\pi}{2}} I_\theta \, d\theta$; but, as we have already pointed out, the correct expression of spherical luminous intensity is represented by $\frac{1}{2}\int_{-\frac{\pi}{2}}^{\frac{\pi}{2}} I_\theta \cos\theta \, d\theta$. Consequently it is necessary to introduce some device which shall reduce the luminous intensity received by the photometer in the ratio $\cos\theta$, where $\theta$ is the angle of elevation or altitude of the revolving mirror above the horizontal plane through the axis O M². For this purpose the slotted disk J is introduced.

The front elevation, Fig. 2, shows the apparatus when the revolving arms occupy the vertical position. Similar letters correspond to similar parts in Fig. 1. Here the observer's eye is facing the tube and in line with the photometer-rod behind it. By unscrewing the set-screws C C the receptacle with its contained mirror may be removed, in which case the eye will directly observe through the tube the photometer-screen beyond.

Fig. 3 shows in detail the tube carrying the revolving arms. T T is the revolving tube, driven by the cord D. It is mounted upon the inner tube N N and supports the arms A and B in the manner shown. The tube T is kept in place on the tube N by the jam-nuts U' U², and carries around with it the receptacle M² and the plane mirror m. The disk J J is carried on an axis X, through a bearing R, and is driven by the gear-wheel K. The disk J J is provided with a number of radial slots.

Fig. 4 shows a face view of the mirror M', supported on the extremity of the revolving arm A A.

Fig. 5 shows a back view of the apparatus and the base H H. K' K² are the gear-wheels, and J J the slotted disk. The number of teeth in the large gear-wheel mounted upon the tube T T is twice as great as the number of teeth in the gear-wheel K², attached to the axle of the disk J J. Consequently the disk will make one complete revolution in the time that the tube makes half a revolution. The position of the disk in the figure corresponds to the horizontal position of the revolving arms, and it will be observed that the incident light passing through the central tube is left unobstructed by the disk. When the vertical arms have passed to the vertical position, the segment P of the disk will be brought before the tube N and will completely obstruct the light. The radial slots cut in the disk are of such angular width that when passing before the center of the tube N N they admit and shut off the light in proportion $\frac{\cos\beta}{1-\cos\beta}$, where $\beta$ is the angle made by the revolving arm at that moment with the horizontal plane, for the slots are cut to an angular width proportional to $\cos\theta$, and the spaces left intact between the slots are therefore left proportional to $1-\cos\theta$. Consequently the ratio of admission to interruption of light at any angle $\theta$ is proportional to $\frac{\cos\theta}{1-\cos\theta}$. For theoretical perfection in the action of the apparatus the number of these radial slits in the disk should be infinite, but for all practical purposes we find that the number of slots represented in the figure is sufficient, provided that the speed of rotation is sufficiently great.

The use of our improved apparatus is particularly valuable in the measurement of the spherical intensity of arc-lamps, since the intensity of their light varies markedly with the angle of depression or elevation. In order to measure the spherical candle-power of an arc-lamp, the apparatus is mounted at the end of the photometer-bar, say upon a wooden beam in the partition of the photometer-room, and a motor is placed in position to drive the apparatus. The arc-lamp is brought into position so that the arc lies on the axis of the tube and in the photometer axis and as nearly as possible in the vertical plane through the revolving mirror M'. The receptacle M² is first removed and the horizontal intensity of the arc determined by direct comparison through the tube N N, containing no mirror, with the aid of a secondary standard, such as a measured incandescent lamp operated at a high temperature. The receptacle M² is then speedily replaced and the measurement repeated with the arms at rest in the horizontal position. The intensity of the luminous pencil at the photometer-screen will in this case be determined by the absorption at the two mirrors M' and $m$, together with the increased distance through which the beam has to pass to the photometer. The observed ratio of the intensity with the mirror $m$ removed and in position may be denoted by $a$. The motor is then started and the arms revolved at a suitable speed. The illumination of the photometer-screen will now be sensibly proportional to $\frac{1}{a\pi}\int_{-\frac{\pi}{2}}^{\frac{\pi}{2}} I_\beta \cos.\beta\, d\beta$, or to $\frac{2S}{a\pi}$, where S is the mean spherical intensity. Consequently if the apparent intensity be multiplied by $a$ and by $\frac{\pi}{2}$ or by 1.5708 $a$ the result will give the mean spherical intensity of the arc in units of intensity adopted.

We have shown in the accompanying drawings a particular method of carrying into practice the principle of our invention. We do not limit ourselves to the particular form therein shown, as it is evident that we may vary the transmitted intensity according to a simple harmonic law in a variety of ways.

By graduating the surface of the base H H the angle of depression or elevation of the revolving arms in any position can be observed, and the distribution of luminous intensity of the source in a vertical plane may be measured successively at any desired angles, the disk J J being temporarily removed for such purposes.

What we claim as our invention, and desire to secure by Letters Patent, is—

1. The hereinbefore-described method of measuring the mean spherical luminous intensity of a source of light, which consists in revolving two mirrors about an axis passing through the source under such conditions, that the light from the source is reflected in different successive angles of a single plane onto the screen of a photometer and also transmitted in this reflected passage according to a simple harmonic law.

2. In an apparatus for measuring the mean spherical luminous intensity of a source of light, the combination of two revolving mirrors and means for varying the intensity transmitted to the photometer according to a simple harmonic law.

EDWIN J. HOUSTON.
ARTHUR E. KENNELLY.

Witnesses:
WILLIAM A. MILLET,
WILLIAM DOUNS ANDERSON.